US012711636B2

(12) United States Patent
Wang et al.

(10) Patent No.: US 12,711,636 B2
(45) Date of Patent: Aug. 18, 2026

(54) IMAGE SEQUENCE TRAJECTORIES FOR VISUAL ODOMETRY

(71) Applicant: Microsoft Technology Licensing, LLC, Redmond, WA (US)

(72) Inventors: Rui Wang, Zurich (CH); Marc André Léon Pollefeys, Zurich (CH); Weirong Chen, Munich (DE)

(73) Assignee: Microsoft Technology Licensing, LLC., Redmond, WA (US)

( * ) Notice: Subject to any disclaimer, the term of this patent is extended or adjusted under 35 U.S.C. 154(b) by 297 days.

(21) Appl. No.: 18/400,708

(22) Filed: Dec. 29, 2023

(65) Prior Publication Data

US 2025/0218003 A1 Jul. 3, 2025

(51) Int. Cl.
*G06T 7/246* (2017.01)
*G06T 5/50* (2006.01)
*G06T 7/73* (2017.01)

(52) U.S. Cl.
CPC ................ *G06T 7/246* (2017.01); *G06T 5/50* (2013.01); *G06T 7/73* (2017.01); *G06T 2207/20076* (2013.01); *G06T 2207/20084* (2013.01); *G06T 2207/30241* (2013.01); *G06T 2207/30244* (2013.01)

(58) Field of Classification Search
CPC .. G06T 7/246; G06T 7/73; G06T 5/50; G06T 2207/20076; G06T 2207/20084; G06T 2207/30241; G06T 2207/30244
See application file for complete search history.

(56) References Cited

U.S. PATENT DOCUMENTS

2023/0074293 A1 * 3/2023 Ivanovic ............... B60W 40/04

OTHER PUBLICATIONS

Cross validated, Why is the Cauchy distribution so useful? (hereafter Cross) (Year: 2019).*
Resolution learning in deep convolutional networks using scale-space theory (Year: 2023).*
Chen, Weirong., "LEAP into Long-term Efficient Any Point Tracking in Visual Odometry", Computer Vision and Pattern Recognition, 2024, 10 Pages.
Doersch, et al., "Tap-vid: A benchmark for tracking any point in a video.", Advances in Neural Information Processing Systems, vol. 35, 2022, 17 Pages.

(Continued)

*Primary Examiner* — Ming Shui
(74) *Attorney, Agent, or Firm* — Barta Jones, PLLC

(57) ABSTRACT

Images captured by a camera moving in an environment are received, and for each of a plurality of points in one of the images, outputs are computed using a neural network. The outputs comprise: a trajectory depicting the point in each of the plurality of images, as well as, for each trajectory, a prediction of visibility of the trajectory in each of the images and a prediction of whether the trajectory depicts a static or moving surface in the environment. The neural network receives the images and points as input and computes the outputs, wherein the outputs comprise for each of the trajectories, confidence data. The outputs are sent to a downstream process selected from any of: visual odometry, structure from motion, human body tracking, video editing, vehicle tracking.

20 Claims, 7 Drawing Sheets

(56) References Cited

OTHER PUBLICATIONS

Fischler, et al., "Random Sample Consensus: A Paradigm for Model Fitting with Applications to Image Analysis and Automated Cartography", In Proceeding of communications of the ACM, vol. 24, No. 6, Jun. 1981, pp. 381-395.
Harley, et al., "Particle video revisited: Tracking through occlusions using point trajectories", In European Conference on Computer Vision, 2022, 17 pages.
Hendrycks, et al., "Gaussian Error Linear Units (gelus)," In Respiratory of arXiv preprint arXiv:1606.08415, Jun. 6, 2023, 10 Pages.
Kopf, et al., "Robust consistent video depth estimation.", Proceedings of the IEEE/CVF Conference on Computer Vision and Pattern Recognition, 2021, pp. 1611-1621.
Teed, et al., "Deep patch visual odometry.", Advances in Neural Information Processing Systems, vol. 36, 2023, 19 Pages.
Teed, et al., "Droid-slam: Deep visual slam for monocular, stereo, and rgb-d cameras.", Advances in neural information processing systems, vol. 34, 2021, 12 Pages.
Wang, et al., "Tracking everything everywhere all at once.", Proceedings of the IEEE/CVF International Conference on Computer Vision, 2023, pp. 19795-19806.
Zhao, et al., "Particlesfm: Exploiting dense point trajectories for localizing moving cameras in the wild.", European Conference on Computer Vision. Cham: Springer Nature Switzerland, Jul. 19, 2022, 25 Pages.

* cited by examiner

IMAGE SEQUENCE TRAJECTORIES FOR VISUAL ODOMETRY

BACKGROUND

An image sequence trajectory depicts the same element in the environment in a sequence of images captured by a camera moving in the environment. Image sequence trajectories facilitate a range of tasks including but not limited to visual odometry, structure from motion, human body tracking, video editing, vehicle tracking. Visual odometry is the task of computing a position and orientation of a camera from images captured by the camera. The position and orientation of a camera is referred to as a pose of the camera and may comprise 6 degrees of freedom. Structure from motion is the task of computing the structure of an environment from images captured by a camera moving in the environment. Human body tracking is the task of computing the pose of a plurality of joints of an articulated representation of the human body. Video editing is facilitated by segmenting foreground regions of images such as by using image sequence trajectories. Vehicle tracking is the task of computing the pose of a vehicle visible from a second vehicle from images captured by a camera in the second vehicle. Computing accurate image sequence trajectories in an efficient way is not straightforward.

The embodiments described below are not limited to implementations which solve any or all of the disadvantages of known ways of computing image sequence trajectories.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

An accurate way of computing image sequence trajectories is described which uses a neural network and which has ability to give confidence data for each of the trajectories and/or wherein the neural network comprises a feature extraction neural network that adaptively aggregates spatial information for each point on a trajectory.

Images captured by a camera moving in an environment are received, and for each of a plurality of points in one of the images, outputs are computed using a neural network. The outputs comprise: a trajectory depicting the point in each of the plurality of images, as well as, for each trajectory, a prediction of visibility of the trajectory in each of the images and a prediction of whether the trajectory depicts a static or moving surface in the environment. The neural network receives the images and points as input and computes the outputs, wherein the outputs comprise for each of the trajectories, confidence data. The outputs are sent to a downstream process selected from any of: visual odometry, structure from motion, human body tracking, video editing, vehicle tracking.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

As mentioned above an image sequence trajectory depicts the same element in an environment in a sequence of images captured by a camera moving in the environment. However, computing accurate image sequence trajectories in an efficient way is not straightforward especially where this is done for so called "long-term tracking" where the image sequence trajectory is to be computed for more than two images in a sequence, such as for 8 or more images in a sequence. The inventors have developed various ways of improving accuracy of recognizing trajectories in sequences of images, such as by using more spatial information within images to facilitate the recognition of trajectories. Inter-trajectory attention is another functionality the inventors have developed to facilitate accuracy of trajectory recognition. By using a probabilistic formulation the technology is able to better handle ambiguities inherent in recognition of trajectories and so improve performance.

In examples the technology is able to recognize trajectories starting from image points in any image of a sequence of images; in contrast to previous approaches. This is especially useful as it gives more flexibility.

In various examples the technology is used to compute trajectories for input to a visual odometry apparatus and particular benefits are found since it is possible to cope with objects that move in the environment and/or occlusions/and/or regions of repeating texture.

Figure 1:
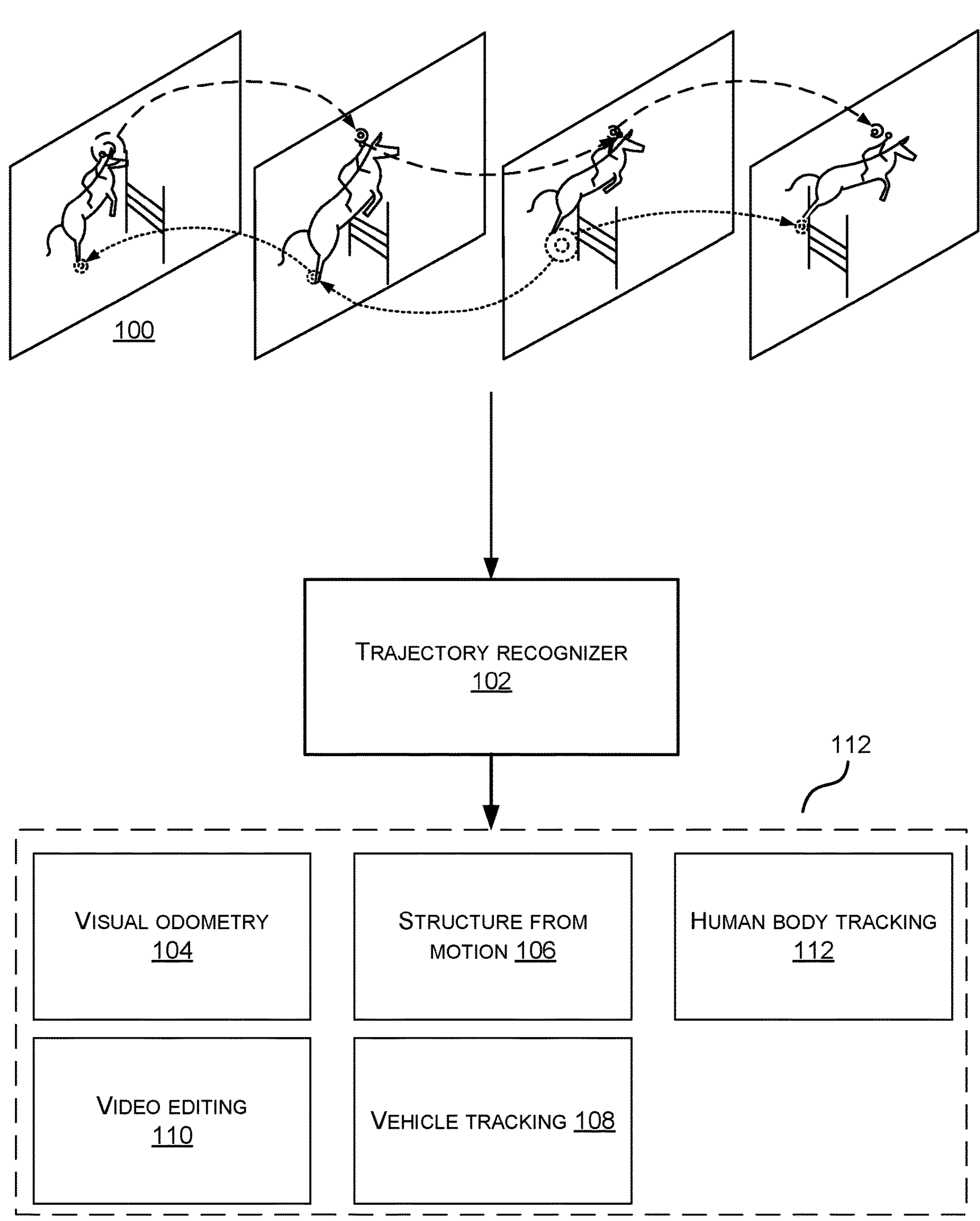
FIG. 1 is a schematic diagram of a trajectory recognizer.

FIG. 1 is a schematic diagram of a computer implemented trajectory recognizer 102 deployed as cloud service or as functionality in a computing device such as a head worn computer, a physical robot, a self-driving vehicle, a camera phone, a structure from motion apparatus, a video editing tool or other equipment. The functionality of the trajectory recognizer is distributed between a client device and a server or companion computing device in some cases.

The trajectory recognizer receives as input a sequence of images such as frames of a video or another sequence of images. The sequence has more than two images and may have 8 or more images. The images have been captured by the same camera moving in an environment such that the sequence is a time series.

The trajectory recognizer comprises neural network technology as described in more detail with reference to FIG. 3. The trajectory recognizer computes outputs comprising: a plurality of trajectories, each trajectory depicting the same environment feature in each of the plurality of images, as well as, for each trajectory, a prediction of visibility of the trajectory (i.e. occluded or not) in each of the images and a prediction of whether the trajectory depicts a static or moving surface in the environment. The trajectory recognizer also outputs, for each of the trajectories, confidence data.

The outputs from the trajectory recognizer are sent to a downstream process selected from any of: visual odometry, structure from motion, human body tracking, video editing, vehicle tracking.

The following notation is used herein. Given a sequence of S consecutive red green blue (RGB) images 100 $I=[I_1, \ldots, I_S]$, $I_s \in \mathbb{R}^{3 \times H \times W}$ as input, an aim of trajectory any point (TAP) is to trace a set of points 304, referred to as query points, across these images. For a specific query point with the 2D pixel coordinate $x_q \in \mathbb{R}2$ in image $s_q$, TAP calculates its trajectory across all S images as $X=[x_1, \ldots, x_S]$, $x_s \in \mathbb{R}^2$, given $x_{Sq}=x_q$. Additionally, TAP estimates the visibility of each point throughout the sequence as $V=[\upsilon_1, \ldots, \upsilon_S]$, where $\upsilon_s \in \{0,1\}$ is a binary label of point visibility indicating whether a point in frame s is visible or occluded. The TAP formulation for a single query can be described as $$(X,V)=\mathrm{TAP}(I,x_q,S_q).$$

Images captured by a camera moving in an environment are received. In an example, the images are received from a camera phone or a wearable computer and may be compressed and sent to the trajectory recognizer. Images are a known type of data structure which is straightforward for the trajectory recognizer to receive. For each of a plurality of points in one of the images, outputs are computed using a neural network. Using neural network technology is found to give accurate performance. The outputs comprise: a trajectory depicting the point in each of the plurality of images, as well as, for each trajectory, a prediction of visibility of the trajectory in each of the images and a prediction of whether the trajectory depicts a static or moving surface in the environment. The neural network receives the images and points as input and computes the outputs, wherein the outputs comprise for each of the trajectories, confidence data. By including confidence data in the outputs significant benefits are achieved since the trajectory recognizer is better able to deal with ambiguities in the images and thus accuracy is improved. Also, having confidence data is useful for downstream processes. The outputs are sent to a downstream process selected from any of: visual odometry 104, structure from motion 106, human body tracking 112, video editing 110, vehicle tracking 108. Thus the trajectory recognizer is useful for a wide range of technical purposes.

The trajectory recognizer of the disclosure operates in an unconventional manner by taking into account uncertainty to achieve accurate, efficient recognition of trajectories with confidence data in an image sequence suitable for use for visual odometry, structure from motion, video editing and other tasks.

Using a trajectory recognizer comprising a feature extraction neural network that adaptively aggregates spatial information for each point in a trajectory improves the functioning of the underlying computing device by enabling more accurate trajectory recognition.

Alternatively, or in addition, the functionality of the trajectory recognizer described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2:
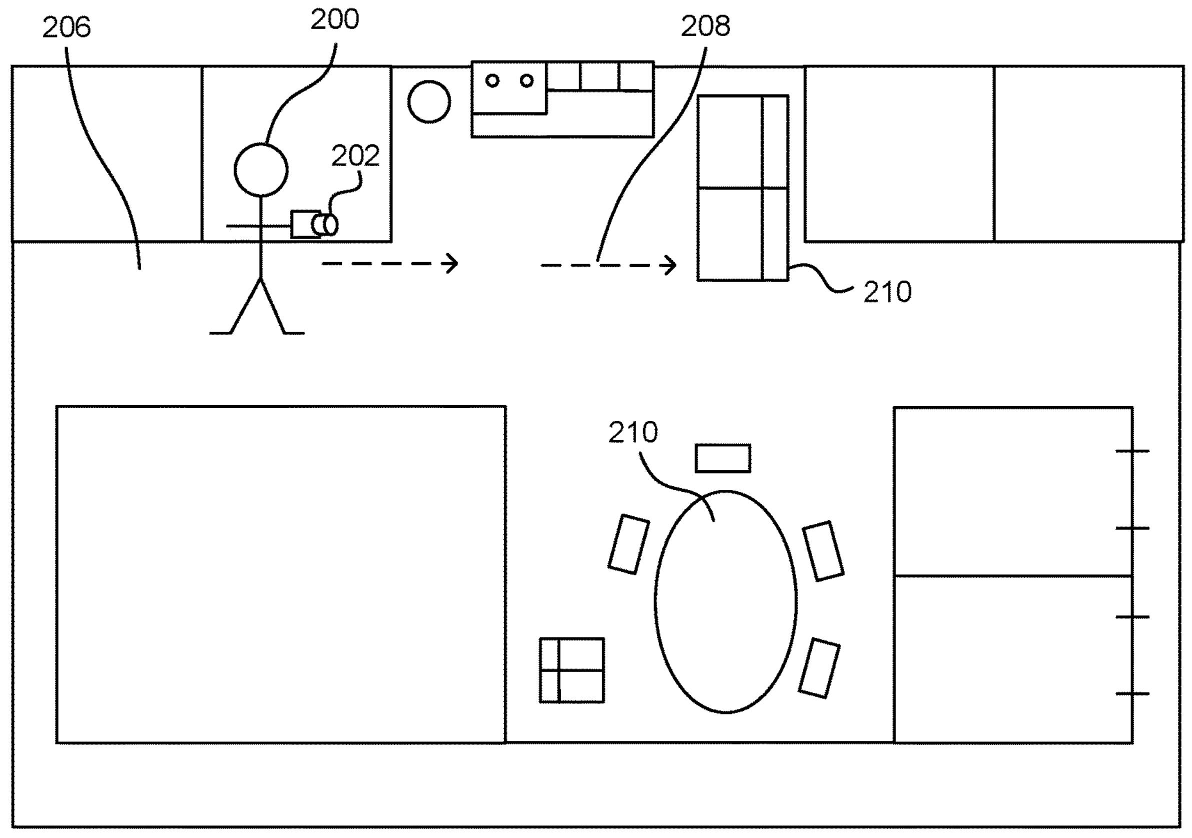
FIG. 2 is a schematic diagram of a camera moving in an office such as for visual odometry.

FIG. 2 is a schematic diagram of a camera moving in an office such as for visual odometry. As mentioned above, the trajectory recognizer provides input to a visual odometry apparatus in some examples. FIG. 2 shows a mobile image capture device such as a camera phone moves in an environment. FIG. 2 is a plan view and shows a person 200 holding a mobile image capture device 102 and walking along a corridor 206 as indicated by dotted arrows 208. In the scene are objects 210 such as walls, seating, a table. As the person walks images of the scene are captured by mobile image capture device 202 and sent to the trajectory recognizer which may be in the mobile image capture device 202 or in the cloud or at another location in communication with the mobile image capture device. The trajectory recognizer uses the captured images to compute a plurality of trajectories and associated confidence data. The trajectories and confidence data are then usable to track a pose (3D position and orientation) of the mobile image capture device 202 using visual odometry as explained in more detail below. Where the trajectory recognizer provides confidence data of the trajectories it is able to take into account uncertainty in the images so that performance of the trajectory recognizer is improved. Performance of the visual odometry apparatus may also be improved.

Figure 3:
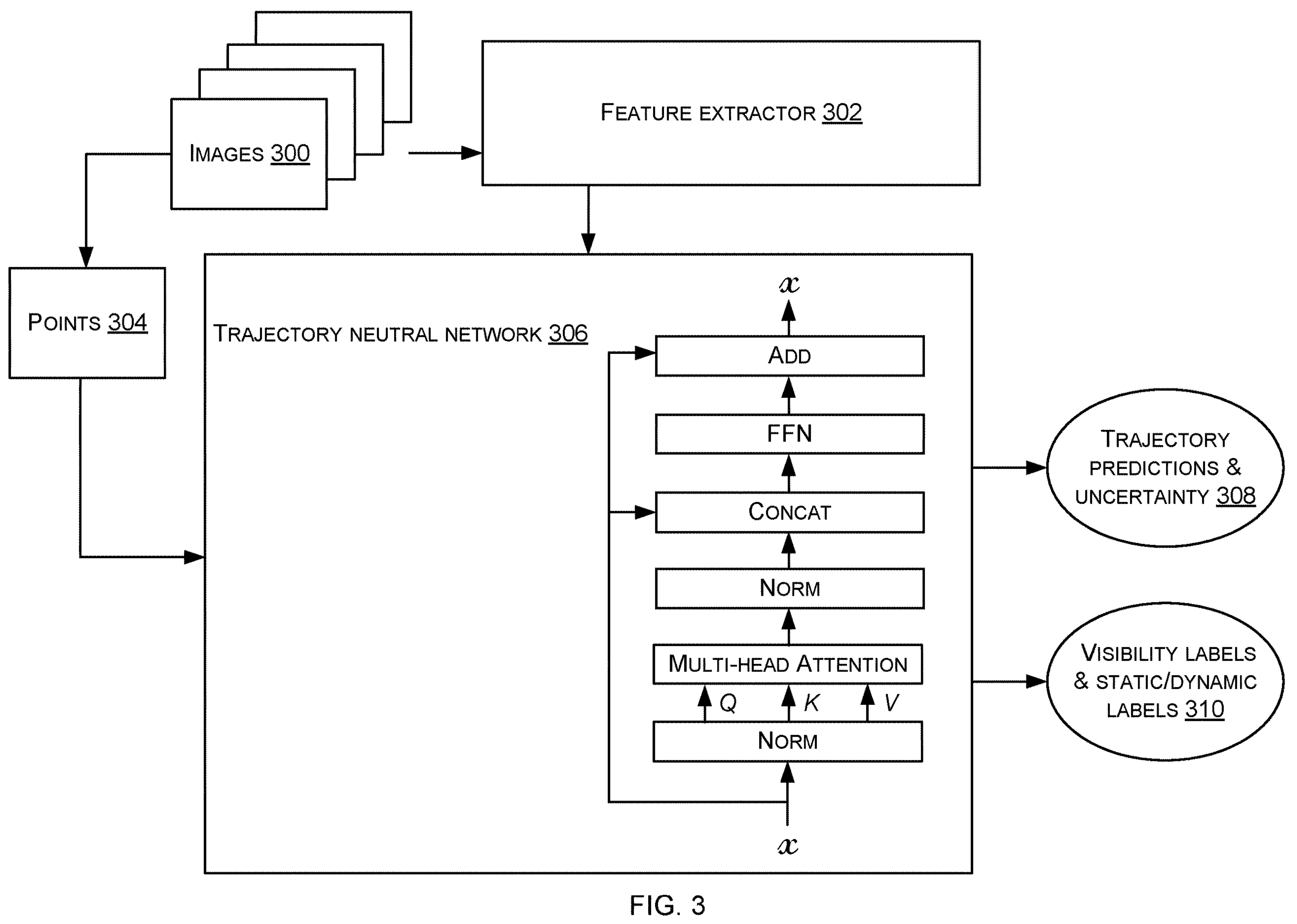
FIG. 3 is a schematic diagram of a trajectory recognizer neural network.

FIG. 3 is a schematic diagram of a trajectory recognizer neural network comprising a feature extractor 302 and a trajectory neural network 306. A sequence of images 300 is input to the feature extractor neural network 302 to obtain features from the images. The features comprise a plurality of feature maps, one per image, where a feature map is an array corresponding to an image and with features derived from the image stored in the array. The feature extractor neural network uses an improved feature extraction method that adaptively aggregates spatial information for each individual pixel to improve feature representation. In examples the feature extraction may be performed for each image independently or using correlation between the images.

Each image $I_s \in I$ is processed through the feature extractor neural network 302 $\mathcal{F}$ to extract a feature map $Y_s=\mathcal{F}(I_s)$. Point features $f_q$ are computed by bilinear sampling at query positions $x_s$ on $Y_s$. Query positions are positions of points 304 that have been selected to originate the trajectories. The point features from each image are concatenated to form a point feature tensor $F=[f_1, \ldots, f_S]$.

In some examples the feature extractor neural network 302 is a transformer neural network such as a vision transformer which employs self-attention to aggregate and exchange patch information with attention connections. Using a vision transformer is found to give good ability to use both local and global contexts in an image. The attention mechanisms explicitly model the relationship between patches, allowing the feature extractor neural network to focus on specific areas based on patch information.

In other examples the feature extractor neural network 302 is a convolutional neural network. Transformer-based spatial feature enhancement provides powerful feature aggregation via self-attention. Nevertheless, the dotproduct self-attention mechanism inherent in the transformer architecture still introduces a considerable computational burden in comparison to convolutional neural networks. This raises a pertinent question: is it feasible to replicate the distinctive advantages of a transformer, including adaptive and dynamic receptive fields, using purely convolutional layers? Motivated by this question, a new type of convolutional neural network is developed, referred to herein as Dilated Deformable CNN (D2-CNN) as an efficient alternative for spatial feature enhancement.

The Deformable Convolutional Network (DCN) offers a variation of a convolutional neural network CNN that enables the model to adaptively adjust the positions of the convolutional filters based on the image features, enabling it to better capture complex spatial transformations from the input. This flexibility makes DCN especially valuable in tasks like object detection and tracking, where objects can manifest in diverse shapes and sizes. The key idea behind the DCN is the deformable convolution layer that employs an adaptive kernel size and positioning. A standard 2D convolutional kernel of size k×k aggregates information from a k×k neighboring region on the feature maps. In contrast, a deformable convolutional does not take the neighborhood from adjacent pixels but learns the neighborhood positions from a separate standard convolutional kernel with same neighborhood size of k×k. In other words, the deformable neighborhood positions rely on the image feature, which can vary between different pixels. Such a design is very suitable for teaching the network to detect and connect each pixel to the useful neighboring pixels via end-to-end training. This approach aligns with a goal of spatial feature enhancement and, importantly, from a computational standpoint, introduces significantly lower overhead than a transformer-based approach.

To explicitly increase the receptive field size, the inventors combine deformable convolutional layer with dilated convolution. Dilated convolution is a variant of standard convolution that introduces gaps (or dilation) into the kernel filters. Compared to standard convolution, the main advantage of dilated convolutions is the increase of receptive field with parameter efficiency. On one hand, dilated convolutions enable the network to capture broader contextual information, and like standard CNN, they maintain the resolution of the feature map. On the other hand, dilated convolutions allow the network to use fewer parameters to achieve the same receptive field than would be required with standard convolutions. This makes dilated convolutions useful for exploring multi-scale contexts.

Formally, the standard 2D convolution first samples a regular grid R around the point p0 on the input feature map y, then applies the weighted sum with the learnable kernel weights w. Taking a standard 3×3 kernel as an example, the corresponding grid is $$R = \{(-1,-1), (-1,0), \ldots, (0,1), (1,1)\}.$$

The output feature map y' at position p0 can be computed as $$y'(p0) = \sum\nolimits_{pn \in R} w(pn) \cdot y(p0 + pn)$$

For a deformable convolution, another learnable kernel operated on R is introduced to predict a 2D offset for each grid point as $\{\Delta pn | n=1, \ldots, N\}$, $N=|R|$.

After applying the offsets, the output of a deformable convolution becomes $$y'(p0) = \sum_{pn \in R} w(pn) \cdot y(p0 + pn + \Delta pn)$$

For a deformable convolution with dilation a, the output can be represented as $$y'(p0) = \sum_{pn \in R} w(pn) \cdot y(p0 + apn + \Delta pn)$$

Examples incorporate multi-scale dilation designs to establish a wider receptive field in a hierarchical fashion. The D2-CNN model utilizes deformable dilated convolutions with exponential dilation rates ($a \in [1, 2, 4, 8]$), enabling each network layer to function at a distinct spatial resolution. With the dilation rate doubling for every consecutive layer, effectively achieve a substantial receptive field without a drastic increase in the number of layers or parameters. Compared to the Transformer-based approach, this strategy remains computationally efficient even for high-resolution input.

FIG. 3 shows the features extracted from the images being input to a trajectory neural network 306 together with points 304 selected from one of the images 300. The present technology enables the points to be selected from any one of the images which is beneficial because it enables the trajectory recognizer to be used for more different types of downstream application. The selected points are the ones from which trajectories are to be computed. So if there are four selected points the task is to compute four trajectories, one trajectory comprising one of the points. In some examples, the selected points 304 include anchor points selected so as to be distributed over the image and to be near edges.

The trajectory neural network 306 is a multi-layer perceptron with iterative refinement. The iterative refinement is used to iteratively update state variables (X, F) where X is the trajectories and where F is the point feature tensor. Initial values of the state variables are obtained by duplicating the query positions and features. During the k-th iterative refinement, the trajectory neural network computes a multi-scale local cost volume $C[X^k]$ centered around the current estimated point position $X^k$. Utilizing this local evidence, the trajectory neural network predicts updates for the state variables via $$(\Delta X, \Delta F) = \text{Refiner}\left(F^k, pos\left(X^k - x_q\right), C^k\left[X^k\right]\right),$$
$$X^{k+1} \leftarrow X^k + \Delta X,\ F^{k+1} \leftarrow F^k + \Delta F$$

where pos(·) refers to the positional embedding. The final point feature $F^k$ is used to predict point visibility with a linear projection layer $\mathcal{G}_v$, yielding $V=\mathcal{G}_v(F^k)$.

The trajectory neural network 306 has three types of layers. A first type of layer enables information exchange along channel dimensions (where channel dimensions are red, green, blue intensity values of pixels in the images). A second type promotes information exchange along the temporal dimension, aggregating information within a single trajectory. A third type facilitates feature exchange across all points within the same image to give inter-trajectory attention. The third type is referred to as an inter-trajectory attention module and it has a structure as illustrated in FIG. 3 where the symbols Q, K, V denote query, key and value of the attention mechanism. It comprises a pre-norm layer, a multi head attention layer, a norm layer, a concatenation layer, a feed forward neural network layer, and an addition layer. To allow an arbitrary number of points during inference, the trajectory neural network 306 uses a self-attention formulation with linear attention. The query vectors Q represent focus tokens, the key vectors K are used to compute attention scores against the query, and the value vectors V, weighted by their attention scores, are summed to create the output. It is found that adding the third type of layer (the inter-trajectory attention) significantly improves performance.

It is found that performance varies depending on the distribution and number of points 304. Because the inter-trajectory attention is more useful where the trajectories are dissimilar. If all points are within a small, texture-less region, they are likely to capture similar features, which can also limit the information gain achievable through inter-trajectory attention. To overcome this constraint, some examples use anchor-based inter-trajectory attention. To select anchor points for an image, a gradient map of the image is computed by using a Sobel Kernel. Average pooling is applied to smooth and reduce feature resolution. The gradient map is partitioned into sub regions (such as grid cells) and for each region one or more features are extracted to be anchor points.

The trajectory recognizer neural network of FIG. 3 uses a probabilistic formulation in some examples. Using a probabilistic formulation enables uncertainty in the images to be taken into account so as to enable improved accuracy. In addition, using a probabilistic formulation enables the outputs to include confidence data about uncertainty of the predicted trajectories. The confidence data is useful for downstream applications.

Supervised learning applied to large-scale datasets has yielded notable advancements in learning-based point tracking methods. Nonetheless, trajectory estimation errors remain a concern, especially under challenging conditions like occlusions, motion blur, or texture less regions. Recognizing the varying reliability of trajectories, integrating an uncertainty estimation mechanism into the correspondence estimation process is advantageous. This is particularly crucial for quality-sensitive tasks such as visual odometry. In examples, the trajectory recognizer computes confidence data comprising probability distribution parameters for each point in each trajectory. The probability distribution parameters comprise a location parameter indicating estimated point position and a scale parameter representing data deviation. In some cases the probability distribution parameters are from a Cauchy distribution as now explained. Using a Cauchy is beneficial for more stable optimization. However, this is not essential as other forms of distribution are used in other cases such as Gaussian distribution. [The probability distribution parameters are updated in an iterative manner in the refinement module of the neural network. By enabling this iterative update to take into account uncertainty the overall quality of performance of the trajectory recognizer is improved.

To evaluate the reliability of point correspondences, incorporate a probabilistic formulation into the TAP pipeline in some examples. Given an image sequence I and a single query point $x_q$, an objective is to compute the conditional probability density of point trajectory as $p(X|I, x_q)$. Recognizing the strong correlation between points within the same trajectory, treating each point in the trajectory as independent becomes sub-optimal. Therefore, model the distribution of point trajectories by applying two multivariate distributions, respectively for the 2D coordinates. Let $X=[a; b]$, where $a\in\mathbb{R}^S$ and $b\in\mathbb{R}^S$ represent the X and Y coordinate of all points in X, respectively. Assuming independence between these two coordinates, the joint probability distribution can be expressed as $p(X|I, x_q)=p(a|I, x_q)\, p(b|I, x_q)$. Adopt the multivariate Cauchy distribution, which is associated with its heavy tails distribution and is more stable for optimization. The probability density function (PDF) of a single coordinate is given by $$p(a|I, x_q) = \frac{\Gamma\left(\frac{1+S}{2}\right)}{\Gamma\left(\frac{1}{2}\right)\pi^{\frac{S}{2}}\left|\sum_a\right|^{\frac{1}{2}}\left[1+(a-\mu_a)^T\sum_a^{-1}(a-\mu_a)\right]^{\frac{1+S}{2}}}$$

and a similar expression is applicable for $p(b|I, x_q)$. $\Gamma$ is the Gamma function. The parameters $(\mu_a, \Sigma_a, \mu_b, \mu_b)$ represent the location and scale matrices for the respective coordinates. During inference, the uncertainty associated with each point is quantified by the sum of diagonal scale estimates at position (s, s) as $\phi(x_s)=\Sigma_a[s, s]+\Sigma_b[s, s]$.

Figure 4:
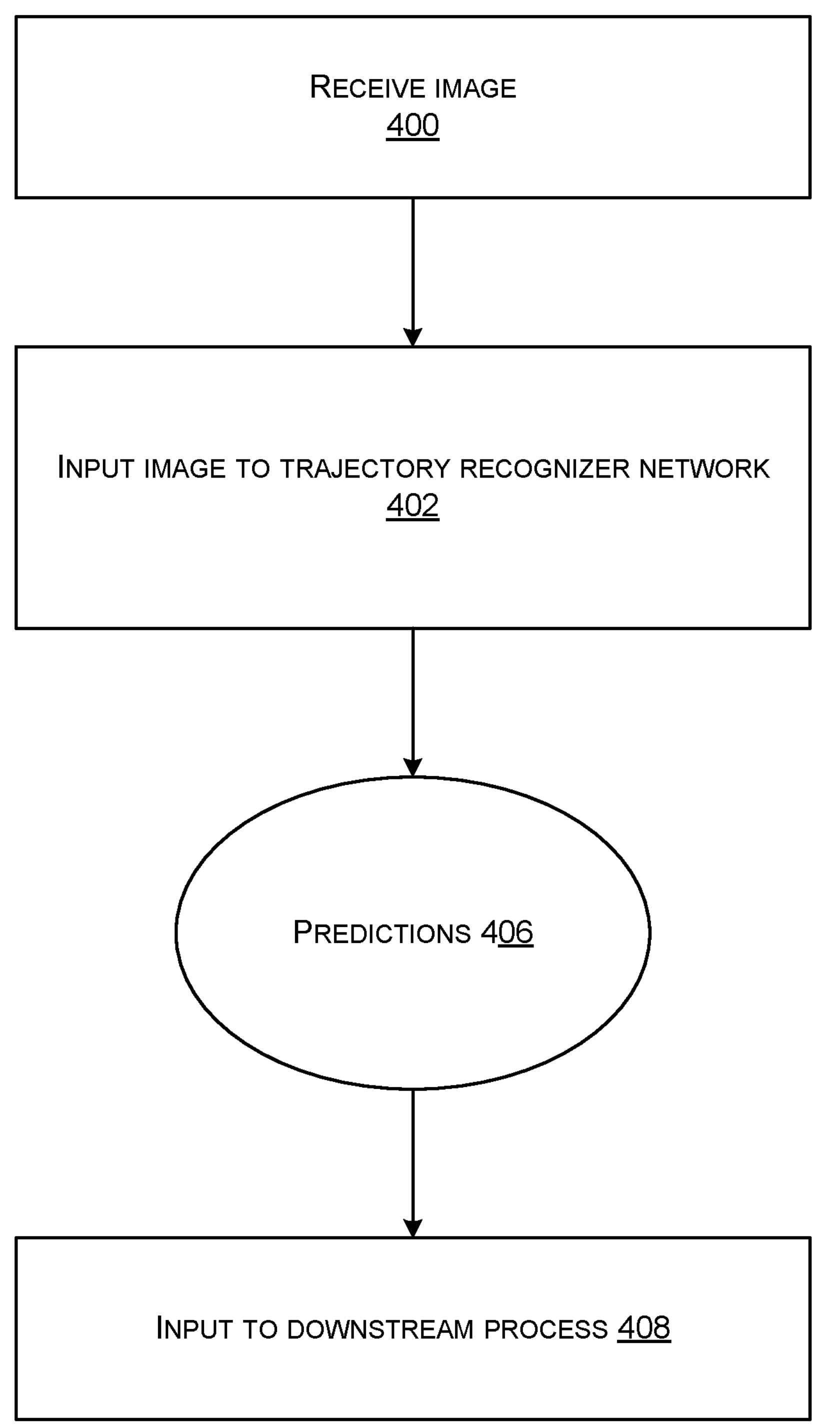
FIG. 4 is a flow diagram of a method of using a trajectory recognizer neural network.

FIG. 4 is a flow diagram of a method of using a trajectory recognizer neural network. A sequence of images is received 400 such as from a camera moving in an environment. The images are input 402 to a trajectory recognizer neural network which computes predictions 406. The predictions comprise a plurality of trajectories, visibility of the trajectories, whether the trajectories are of static or dynamic elements in the environment, and optionally confidence data. The predictions are input 408 to a downstream process as indicated in FIG. 1.

Rather than just predicting the positions of points within a trajectory, the trajectory neural network with a probabilistic formulation focuses on recovering the distribution of point trajectories by estimating its parameters. The location parameter predictions can be associated with the previous point trajectory as $[\mu_a; \mu_b]=X$. However, directly deriving a symmetric and positive definite scale matrix from model outputs is challenging. To address this, employ a kernel-based approach with the linear kernel $K(x, y)=x^T y$. During each iteration, two scale matrices $(\Sigma_a, \Sigma_b)$ are constructed by first applying two linear projection layers to the point features, represented as $$F_a^k = \mathcal{G}_a(F^k) \text{ and } F_b^k = \mathcal{G}_b(F^k).$$

Then compute the scale matrices as $\Sigma_a=K(F_a, F_a)+\sigma I$, and $\Sigma_b=K(F_b, F_b)+\sigma I$, where $\sigma$ is a small positive value and I is the identity matrix. The model parameters are refined through Maximum Likelihood Estimation (MLE) using a negative log-likelihood (NLL) loss function.

Figure 5:
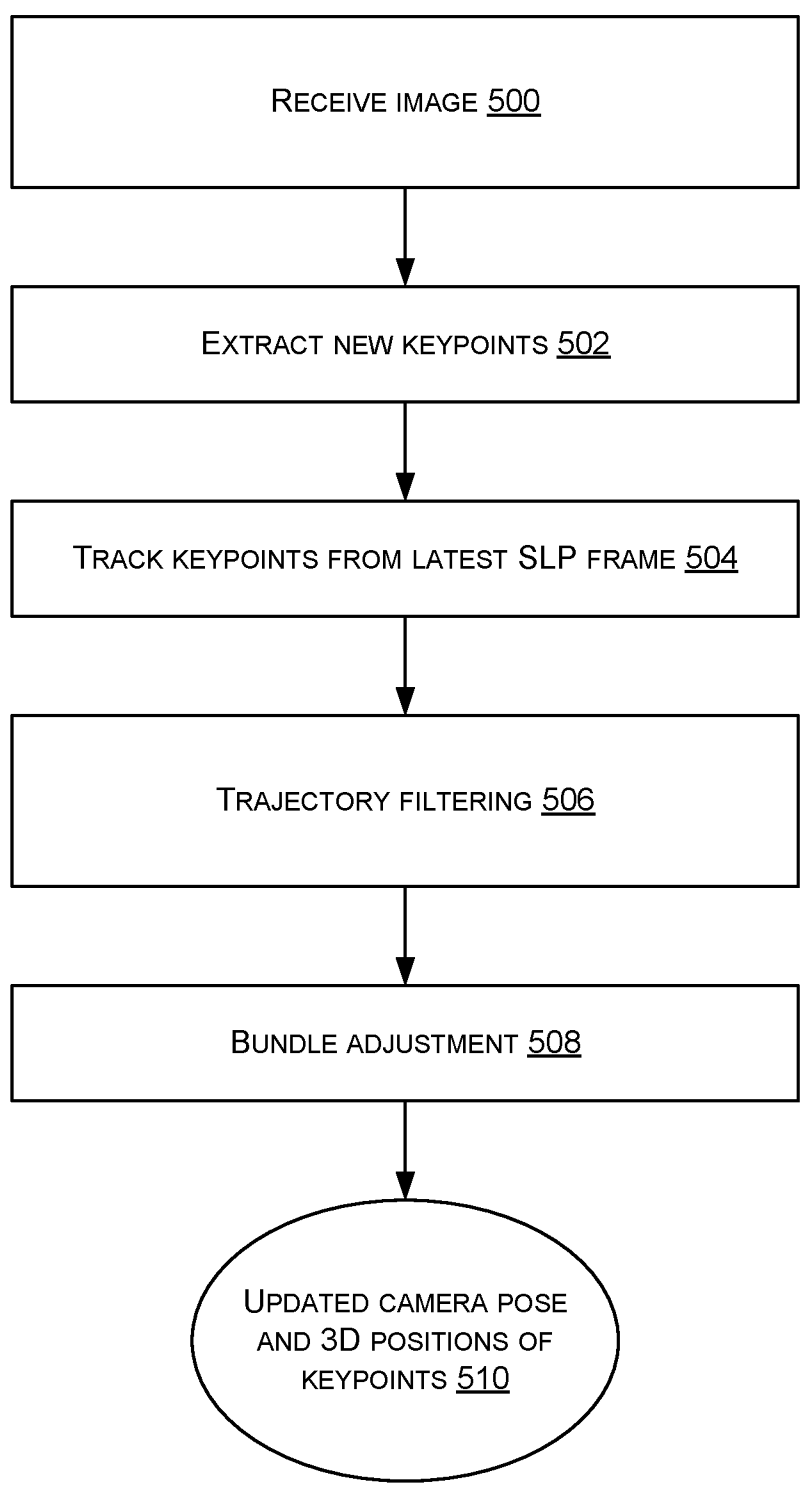
FIG. 5 is a flow diagram of a method of visual odometry.

FIG. 5 is a flow diagram of a method of visual odometry. A next image in a sequence of images is received 500 and new keypoints are extracted 502 from one of the images. Trajectories are computed from the keypoints from the latest SLP image 504. The trajectories are computed using the trajectory recognizer described herein. The trajectories are then filtered 506. The trajectories that remain after the filtering are used in a bundle adjustment process 508 to obtain updated 510 camera pose and updated 3D positions of the keypoints.

When a new image $I_t$ is received 500 at time t, sample 502 N new keypoints from this image to initiate point tracking. The keypoints are selected to have feature distinctiveness and distribution. The trajectory recognizer then tracks these keypoints across the $S_{LP}$ images (i.e. the images used by the trajectory neural network) performing bidirectional tracking (both forward and backward in time). Notably, $S_{LP}$ can exceed the model window S, thus enabling more expansive tracking capabilities through sequential prediction.

Theoretically, precise camera pose estimation between two images can be attained with just a few accurate correspondences under certain conditions. However, the quality of correspondences obtained from feature matching or optical flow can vary. Traditional visual odometry pipelines often use random sample consensus (RANSAC) to filter out incorrect matches, but their efficiency decreases with more keypoints and views. The present technology, in contrast, bypasses the sampling-based method and uses trajectory quality assessments from the trajectory recognizer for more efficient and informative trajectory filtering.

The trajectory recognizer model has the capability to estimate not only the 2D point positions within a trajectory but also the visibility of each point and the dynamic trajectory label of the entire trajectory. Thresholds $\gamma_\upsilon$ for visibility and $\gamma_d$ for dynamic trajectory labels are set to ensure that only visible and static points are utilized in the bundle adjustment process.

The trajectory recognizer provides confidence data in some examples. In those cases, select only high-confidence points, which correspond to low uncertainty measurements. Denoting the trajectory recognizer's uncertainty estimation $\Phi$, retain points that exhibit high confidence using the criterion $\Phi \leq Q(\gamma_u)$, where $\gamma_u$ is the uncertainty quantile and $Q:[0,1] \rightarrow \mathbb{R}$ is the quantile function.

After filtering, evaluate and remove trajectories with insufficient observations, as bundle adjustment is more reliable with increased observations and wider baselines. Trajectories with fewer than Y track valid points are excluded from optimization cost computation due to their potential unreliability. Determine $\gamma_{track}$ empirically.

With the point validation mask established, proceed to define the optimization cost function for a sliding window bundle adjustment. The window size for local bundle adjustment, denoted as $S_{BA}$, may differ from the point tracking window size $S_{LP}$. Using geometric bundle adjustment aims to optimize camera poses T and 3D scene point positions Q by aligning the induced point trajectory from the projective relationship, with the estimated point trajectory from the trajectory recognizer. Parameterize a 3D scene point $Q_i$ by its 2D keypoint location $x_i$ in image $I_i$ and depth $d_i$. Let Trajectoryrecognizer$_{i \rightarrow j}$ denote the mapping of a keypoint from $I_i$ to $I_j$ using the trajectory recognizer. The reprojection cost is formulated as:

$$\sum_i \sum_{j \in |i-j| \leq S_{BA}} \sum_n W_{i \rightarrow j,n} \left\| \mathcal{P}(T_i, T_j, K, d_{i,n}) - \mathit{Trajectoryrecognizer}_{i \rightarrow j}(x_i, n) \right\|_\rho$$

Where $\|\|\rho$ is the distance metric, and the weight $w_{i \rightarrow j,n}$ is derived from the trajectory filtering results. Use the Gauss-Newton method to optimize the reprojection cost for $K_{BA}$ iterations. At each iteration, compute the camera pose update $\Delta\zeta^{(k)} \in se(3)$ (lie-algebra corresponding to T), and the depth update $\Delta D^{(k)}$ for each point. The optimization can be solved efficiently with the Schur decomposition. Use the robust Huber loss function for the distance metric.

In an experiment the trajectory recognizer was trained on the TAP-VidKubric training set. The feature extractor was loaded with pre trained weights and trained end to end with the trajectory neural network for 100,000 steps using 4 NVIDIA A100 GPUs in parallel. During training, use K=4 steps for iterative refinements, N=256 for the number of queries, S=8 for the model window, and SLP=16 for the tracking window. For inter-trajectory anchor-based attention, the number of anchors was 64. The loss weights are set to $w_1=1.0$, $w_2=0.5$, $w_3=0.5$. Perform 4 steps for each bundle adjustment with the Huber Loss for distance metric. The bundle adjustment window size SBA is set to 15. Trajectory filtering parameters are set at $\gamma_\upsilon=0.9$, $\gamma_d=0.9$, $\gamma_u=0.8$, $\gamma_{track}=3$. The results of the experiment found improved performance against state-of-the-art visual odometry approaches where evaluations were conducted on image sequences of static scenes or scenes with dynamic objects.

Figure 6:
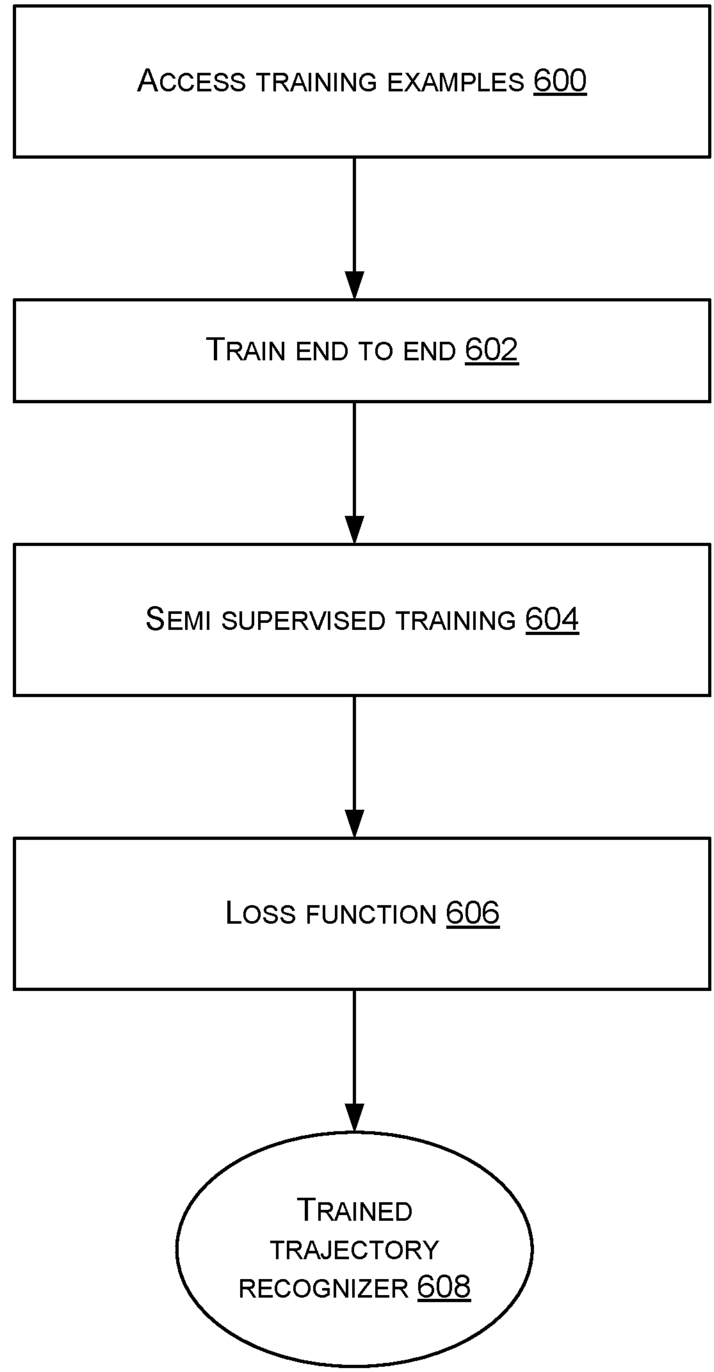
FIG. 6 a flow diagram of a method of training a trajectory recognizer neural network such as that of FIGS. 1 and 2.

FIG. 6 a flow diagram of a method of training a trajectory recognizer neural network such as that of FIGS. 1 and 2. Training examples are accessed 600. The training examples comprise sequences of tens to hundreds of images with known trajectories, known trajectory visibility and known trajectory static/dynamic labels. In some cases the training examples are simulated by taking known camera trajectories and computing a sequence of images captured by a virtual camera following the trajectory in a synthetic indoor environment. In some cases the MPI Sintel dataset is used. In some cases the TartanAir Shibuya dataset is used. The trajectory recognizer is trained end-to-end 602. That is, the feature extractor neural network and the trajectory neural network are trained together using supervised or semi-supervised training 604. End to end training means that values are forward propagated through both the feature extractor and the trajectory neural network before computing a loss and then backpropagating the loss through both the trajectory neural network and the feature extractor. An example loss function 606 which may be used is now given and is not intended to be a limiting example as other types of loss may be used such as cross-entropy loss.

Supervise the point trajectory mainly with the negative log likelihood (NLL) loss, which is based on the predicted distribution parameters and the ground-truth point trajectory. The main point trajectory loss is given as $$\mathcal{L}_{main} = \sum_k^K \gamma^{K-k} \mathcal{L}_{NLL}\left(X^k, X^*, \sum\nolimits_a^k, \sum\nolimits_b^k\right)$$

where K is the number of iteration and $\gamma=0.8$.

For the visibility and dynamic trajectory label supervision, use the cross entropy loss with the estimates V, $m_d$ and ground truth V*, $m_d$* as $$\mathcal{L}_{vis} = (1 - V*)\log(1 - V) + V*\log V$$

$$\mathcal{L}_{dyn} = (1 - m_d^*)\log(1 - m_d) + m_d^*\log m_d$$

The total loss is a weighted sum of three losses:

$$\mathcal{L}_{total}=w_1\mathcal{L}_{main}+w_2\mathcal{L}_{vis}+w_3\mathcal{L}_{dyn}$$

Figure 7:
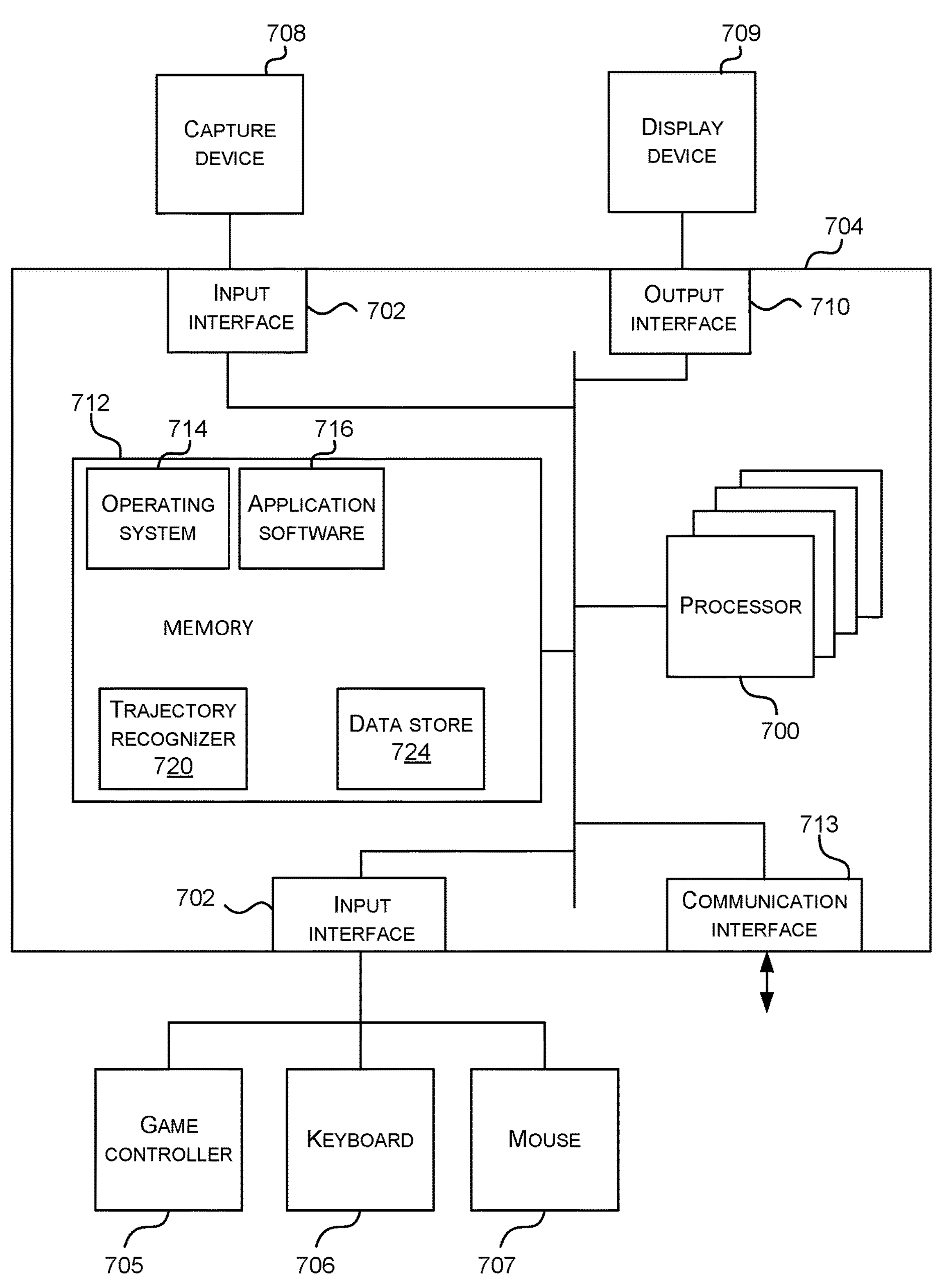
FIG. 7 illustrates an exemplary computing-based device in which a trajectory recognizer is implemented.

FIG. 7 illustrates an exemplary computing-based device in which a trajectory recognizer is implemented. Computing-based device 704 is implemented as any form of a computing and/or electronic device and a non-exhaustive list of examples is: a head worn computer, a camera phone, a self-driving vehicle, a physical robot, a game console, a laptop computer, a data centre compute node.

Computing-based device 704 comprises one or more processors 700 which are microprocessors, controllers or any other suitable type of processors for processing computer executable instructions to control the operation of the device in order to recognize trajectories in a sequence of images, or for carrying out visual odometry, or other tasks such as but not limited to video editing, structure from motion. In some examples, for example where a system on a chip architecture is used, the processors 700 include one or more fixed function blocks (also referred to as accelerators) which implement a part of the method of any of FIGS. 4 to 6 in hardware (rather than software or firmware). The computing-based device has a trajectory recognizer 720. Data store 724 holds images, uncertainty data, trajectories, visibility labels, static/dynamic labels, confidence data or other data. Platform software comprising an operating system 714 or any other suitable platform software is provided at the computing-based device to enable application software 716 to be executed on the device.

The computer executable instructions are provided using any computer-readable media that is accessible by computing based device 704. Computer-readable media includes, for example, computer storage media such as memory 712 and communications media. Computer storage media, such as memory 712, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 712) is shown within the computing-based device 704 it will be appreciated that the storage is, in some examples, distributed or located remotely and accessed via a network or other communication link (e.g. using communication interface 713).

The computing-based device 704 also comprises an input interface 702 and an output interface 710. The output interface 710 is arranged to output display information to a display device 709 which may be separate from or integral to the computing-based device 704. The display information may provide a graphical user interface. The input interface 702 is arranged to receive and process input from one or more devices, such as a user input device (e.g., a mouse 707, keyboard 706, game controller 705, capture device 708, such as a camera microphone or other sensor).

Alternatively or in addition to the other examples described herein, examples include any combination of the following clauses:

Clause A. A computer-implemented method comprising:

receiving a sequence of two or more images captured by a camera moving in an environment;

for each of a plurality of points in one of the images, computing outputs comprising: a trajectory depicting the point in each of the plurality of images, as well as, for each trajectory, a prediction of visibility of the trajectory in each of the images and a prediction of whether the trajectory depicts a static or moving surface in the environment;

wherein computing the trajectories comprises using a neural network which receives the images and points as input and computes the outputs, wherein the outputs comprise for each of the trajectories, confidence data;

sending the outputs to a downstream process selected from any of: visual odometry, structure from motion, human body tracking, video editing, vehicle tracking.

Clause B. The method of clause A wherein the confidence data comprises probability distribution parameters for each point in each trajectory. Probability distribution parameters give a concise, effective way to describe a probability distribution and so facilitate ability of the neural network to take into account uncertainty in the data.

Clause C. The method of clause B wherein the probability distribution parameters comprise a location parameter indicating estimated point position and a scale parameter representing data deviation. Location and scale are concise parameters so memory is used efficiently.

Clause D. The method of clause B or clause C wherein the probability distribution parameters are from a Cauchy distribution. Using a Cauchy distribution is found to give better performance than using a Gaussian distribution for example.

Clause E. The method of any of clauses B to D wherein the probability distribution parameters are updated in an iterative refinement module of the neural network. Using iterative refinement gives a way to improve accuracy.

Clause F. The method of any preceding clause wherein the neural network comprises a feature extraction neural network that adaptively aggregates spatial information for each point.

Clause G. The method of any preceding clause wherein the neural network comprises a feature extraction neural network that performs feature enhancement for each image independently.

Clause H. The method of any preceding clause wherein the neural network comprises a feature extraction neural network that performs feature enhancement using correlation between the images. Using correlation between the images is found to improve performance.

Clause I. The method of any preceding clause wherein the neural network comprises a feature network neural network having a deformable convolution layer that employs adaptive kernel size and positioning. This is found to give particularly good improvements in performance without undue increase in computation burden since there is no need to use a transformer neural network for the feature detection.

Clause J. The method of any preceding clause wherein the neural network comprises a feature neural network having a dilated convolution which introduces gaps into kernel filters.

Clause K. The method of clause K wherein the dilution rate doubles for every consecutive layer of the feature neural network.

Clause L. The method of any preceding clause wherein the neural network comprises a spatial mixer component that facilitates information exchange across all points within the same image.

Clause M. The method of clause L wherein the spatial mixer component comprises a channel mixer which combines information channel-wise for each point, an inter-trajectory mixer which combines information between different trajectories and a temporal mixer which combines information within the same trajectory. The inter-trajectory mixer particularly improves the performance.

Clause N. The method of any preceding clause wherein the points comprise a plurality of anchor points, one anchor point per grid cell of one of the images, and where each anchor point depicts an edge in the image.

Clause O. A computer-implemented method of computing position and orientation of a camera moving in an environment comprising:

receiving a sequence of two or more images captured by the camera moving in the environment;

for each of a plurality of points in one of the images, computing outputs comprising: a trajectory depicting the point in each of the plurality of images, as well as, for each trajectory, a prediction of visibility of the trajectory in each of the images and a prediction of whether the trajectory depicts a static or moving surface in the environment;

wherein computing the trajectories comprises using a neural network which receives the images and points as input and computes the outputs, wherein the outputs comprise for each of the trajectories, confidence data;

selecting individual ones of the trajectories with confidence data above a threshold and with predicted visibility of the trajectory above a threshold and with a prediction of whether the trajectory depicts a static surface above a threshold; computing a position and orientation of the camera from the selected individual ones of the trajectories.

Clause P. The method of clause O where computing the position and orientation of the camera from the selected individual ones of the trajectories comprises using bundle adjustment with a bundle adjustment window greater than the number of images.

Clause Q. The method of clause O or clause P wherein the neural network has been trained using semi-supervised learning that tracks a first plurality of the points referred to as queries and a second plurality of the points referred to as anchor points together but only calculates losses using query predictions.

Clause R. The method of any of clauses O to Q wherein the neural network comprises a feature network neural network having a deformable convolution layer that employs adaptive kernel size and positioning.

Clause S. The method of any of clauses O to R wherein the neural network comprises a spatial mixer component that facilitates information exchange across all points within the same image.

Clause T. An apparatus comprising:

a processor;

a memory storing instructions that, when executed by the processor, perform a method comprising:

receiving two or more images captured by a camera moving in an environment;

for each of a plurality of points in one of the images, computing outputs comprising: a trajectory depicting the point in each of the plurality of images, as well as, for each trajectory, a prediction of visibility of the trajectory in each of the images and a prediction of whether the trajectory depicts a static or moving surface in the environment;

wherein computing the trajectories comprises using a neural network which receives the images and points as input and computes the outputs, and wherein the neural network comprises a feature extraction neural network that adaptively aggregates spatial information for each point;

sending the outputs to a downstream process selected from any of: visual odometry, structure from motion, human body tracking, video editing, vehicle tracking.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A computer-implemented method comprising:

receiving a sequence of a plurality of images captured by a camera moving in an environment;

for each of a plurality of points in one of the plurality of images, computing outputs comprising: a trajectory depicting the plurality of points in each of the plurality of images, as well as, for each trajectory, a prediction of visibility of the trajectory in each of the plurality of images and a prediction of whether the trajectory depicts a static or moving surface in the environment;

wherein computing the trajectories comprises using a neural network which receives the plurality of images and the plurality of points as input and computes the outputs, wherein the outputs comprise for each of the trajectories, confidence data;

selecting individual ones of the trajectories with the confidence data above a threshold, the prediction of visibility of the trajectory above a threshold, and the prediction of whether the trajectory depicts the static surface above a threshold;

computing a position and orientation of the camera from the individual ones of the trajectories; and sending the individual ones of the trajectories to a downstream process.

2. The method of claim 1, wherein the confidence data comprises probability distribution parameters for each point in each trajectory.

3. The method of claim 2, wherein the probability distribution parameters comprise a location parameter indicating estimated point position and a scale parameter representing data deviation.

4. The method of claim 2, wherein the probability distribution parameters are from a Cauchy distribution.

5. The method of claim 2, wherein the probability distribution parameters are updated in an iterative refinement module of the neural network.

6. The method of claim 1, wherein the neural network comprises a feature extraction neural network that adaptively aggregates spatial information for each point.

7. The method of claim 1, wherein the neural network comprises a feature extraction neural network that performs feature enhancement for each image independently.

8. The method of claim 1, wherein the neural network comprises a feature extraction neural network that performs feature enhancement using correlation between the images.

9. The method of claim 1, wherein the neural network comprises a feature neural network having: a deformable convolution layer that employs adaptive kernel size and positioning, or a dilated convolution which introduces gaps into kernel filters.

10. The method of claim 1, wherein the downstream process is selected from any of: visual odometry, structure from motion, human body tracking, video editing, and vehicle tracking.

11. The method of claim 9, wherein dilution rate of the dilution convolution doubles for every consecutive layer of the feature neural network.

12. The method of claim 1, wherein the neural network comprises a spatial mixer component that facilitates information exchange across all points within the same image.

13. The method of claim 12, wherein the spatial mixer component comprises a channel mixer which combines information channel-wise for each point, an inter-trajectory mixer which combines information between different trajectories, and a temporal mixer which combines information within the same trajectory.

14. The method of claim 1 wherein the plurality of points comprises a plurality of anchor points, one anchor point per grid cell of one of the images, and where each anchor point depicts an edge in the one of the images.

15. A computer-implemented method of computing position and orientation of a camera moving in an environment comprising:

receiving a sequence of two or more images captured by the camera moving in the environment;

for each of a plurality of points in one of the images, computing outputs comprising: a trajectory depicting the point in each of the images, as well as, for each trajectory, a prediction of visibility of the trajectory in each of the images and a prediction of whether the trajectory depicts a static or moving surface in the environment;

wherein computing the trajectories comprises using a neural network which receives the images and the plurality of points as input and computes the outputs, wherein the outputs comprise for each of the trajectories, confidence data;

selecting individual ones of the trajectories with confidence data above a threshold, the prediction of visibility of the trajectory above a threshold, the prediction of whether the trajectory depicts the static surface above a threshold; and computing a position and orientation of the camera from the selected individual ones of the trajectories.

16. The method of claim 15, wherein computing the position and orientation of the camera from the selected individual ones of the trajectories comprises using bundle adjustment with a bundle adjustment window greater than the two or more images.

17. The method of claim 15, wherein the neural network has been trained using semi-supervised learning that tracks a first plurality of the points referred to as queries and a second plurality of the points referred to as anchor points together but only calculates losses using query predictions.

18. The method of claim 15, wherein the neural network comprises; a feature neural network having a deformable convolution layer that employs adaptive kernel size and positioning, or an inter-trajectory attention mechanism.

19. The method of claim 15, further comprising sending the individual ones of the trajectories to a downstream process selected from visual odometry, structure from motion, human body tracking, video editing, and vehicle tracking.

20. An apparatus comprising:

a processor;

a memory storing instructions that, when executed by the processor, perform a method comprising:

receiving two or more images captured by a camera moving in an environment;

for each of a plurality of points in one of the images, computing outputs comprising: a trajectory depicting the point in each of the images, as well as, for each trajectory, a prediction of visibility of the trajectory in each of the images and a prediction of whether the trajectory depicts a static or moving surface in the environment;

wherein computing the trajectories comprises using a neural network which receives the images and the plurality of points as input and computes the outputs, and wherein the outputs comprise for each of the trajectories, confidence data; and computing a position and orientation of the camera from the outputs comprising the confidence data.

* * * * *